(No Model.)
C. H. ROTH.
PNEUMATIC TIRE.
No. 531,335. Patented Dec. 25, 1894.
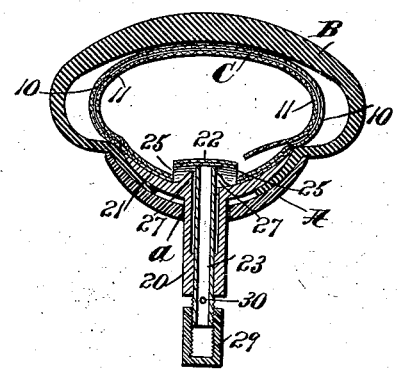
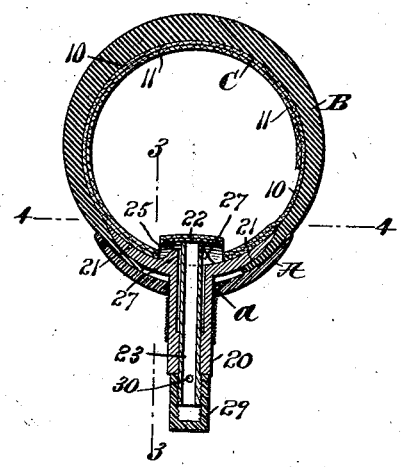
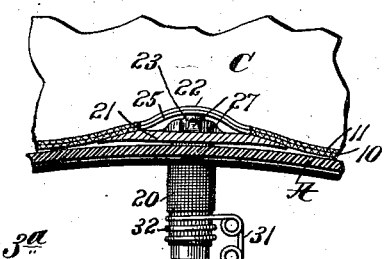
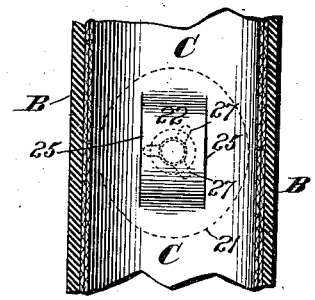
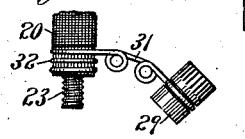
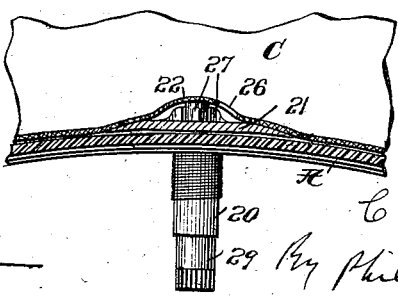
Attest:
Geo. H. Potts.
Arthur L. Kent.
Inventor:
Charles H. Roth
By Philipp Munson & Phelps
Attys.

UNITED STATES PATENT OFFICE.

CHARLES H. ROTH, OF CINCINNATI, OHIO.

PNEUMATIC TIRE.

SPECIFICATION forming part of Letters Patent No. 531,335, dated December 25, 1894.

Application filed January 20, 1894. Serial No. 497,483. (No model.)

*To all whom it may concern:*

Be it known that I, CHARLES H. ROTH, a citizen of the United States, residing at Cincinnati, county of Hamilton, and State of Ohio, have invented certain new and useful Improvements in Pneumatic Tires, fully described and represented in the following specification and the accompanying drawings, forming a part of the same.

My invention relates to pneumatic or air cushion tires for bicycles and other vehicles, and more particularly to that class of pneumatic tires which are formed with an inner air tube and an outer restraining and protecting envelope, and further relates to an improved valve for inflatable tubes and bags especially adapted for use with pneumatic tires on bicycles and other vehicles.

In the manufacture and use of pneumatic tires, great difficulty has been experienced from the liability of such tires to collapse on being punctured in passing over sharp articles, such as nails or broken glass, and although many attempts have been made to remedy this defect, the means employed have generally been such as to greatly increase the weight of the tire, or to destroy its resiliency.

One object of my invention is to provide an air tube which shall be practically self-healing, and shall at the same time not be materially heavier or more expensive than the ordinary form of air tube, and to this end my invention consists of an air tube having a plurality of layers formed from a single strip of suitable material, such as thin india-rubber, so that the inner layer or layers shall form a continuous flap within the air tube which shall be free therefrom.

A further object of my invention is to provide a simple, cheap and easily manipulated air or gas valve especially adapted for use with pneumatic tires, which shall be efficient in restraining the air within the air tube, and not liable to get out of order, and at the same time shall provide a simple means for deinflating the tube. This part of my invention consists of certain novel constructions whereby a portion of the wall of the air tube is arranged to act as a check valve against the escape of the air and of certain novel means for deinflating, and of a means for holding the dust cap while the tire is being inflated, all as will be hereinafter more fully described and specifically pointed out in the claims.

Reference is to be had to the accompanying drawings, forming part of this specification, in which I have shown my improved air tube and valve in preferred forms.

Figure 1 is a cross section of a pneumatic tire provided with my improved air tube and valve, the tire being uninflated. Fig. 2 is a cross section similar to Fig. 1 but showing the tire inflated. Fig. 3 is a view on line 3 of Fig. 2. Fig. 3ª is a broken view similar to Fig. 3, but showing the dust cap as it is supported when detached. Fig. 4 is a view on line 4 of Fig. 2. Fig. 5 is a view similar to Fig. 3, but showing a modification of the valve, and also showing the inner tube of the common form.

Referring to the drawings, and first to Figs. 1, 2, 3 and 4, A is a wheel rim and B is an outer envelope or cover, both of any suitable form, and not further described as they form no part of my invention.

C represents the air tube having an outer layer of thin, supple india-rubber 10 which forms the tube proper, and an inner layer 11 integral with the part 10 but free therefrom, forming a continuous flap within the annular tube 10, as is clearly shown in Figs. 1 and 2. The effect of this construction is to form a tube which is double in the part likely to be punctured, but in which, while the outer wall will be stretched and under tension when the tire is inflated, the inner flap, being free, will assume a position as shown in Fig. 2, lying close against the outer wall 10 but retaining its normal condition unstretched and without being placed under tension. Since the edge of the inner layer or flap 11 is free from the outer layer or tube 10 the pressure of the air in the tube while holding it against the outer tube will yet allow it to give way before a nail or other obstruction which should happen to pierce the outer tube; and when the nail is withdrawn the suction of the air through the hole in the outer tube will draw the flap tightly over the hole, and the pressure of the air inside the tube will hold it firmly in place and prevent any leakage whatever through the puncture in the outer tube, as will be readily understood.

I have shown and described my tire as formed of a strip of rubber of such width that the tube shall have only two layers, but it will be understood that the strip from which the tube is made may be of any desired width to form any desired number of layers.

Through an opening *a* in the rim A extends a sleeve 20 preferably of tough india-rubber or other strong elastic material, and formed at its inner end with a broad flange 21 which is secured to the tube C by cement or other means. In securing the flange 21 to the tube C, I leave that part of the wall of the tube opposite the central portion of the flange and the end of the sleeve 20 free from the flange, the portion of the wall of the tube thus left free forming a flexible elastic diaphragm 22. Within the sleeve 20 I secure a tube 23 which is preferably slightly longer than the sleeve 20, and is fixed so as to extend a little beyond the inner face of the flange 21 so that the diaphragm 22 shall normally bear against the end of the tube 23, and act as a check valve to prevent air from passing out through the tube 23.

To provide for the passage of air from beneath the diaphragm 22 into the tube C, I form one or more openings through the diaphragm and just to one side from the end of the tube 23. These openings may be in the form of slits 25 cut in the diaphragm on each side of the end of the tube 23, as shown in Figs. 1, 2, 3, and 4, or a slit on only one side of the diaphragm, or there may be one or more holes or openings 26, as shown in Fig. 5; or I may use any other form of openings to provide communication between the interior of the tube and the outside of the diaphragm 32.

In securing the tube 23 within the sleeve 20, I vulcanize or otherwise secure leak-tight that part of the sleeve 20 at and near its outer end to the tube 23, leaving the portion of the sleeve at and near its inner end free around the tube 23 to allow of that portion of the sleeve stretching in the operation of deinflating, as hereinafter set forth. The inner face of the flange 21 around the end of the bore of the sleeve 20 is so formed that when the tube 23 is drawn away from the diaphragm 22 in deinflating as hereinafter explained, the escape of the air may not be hindered by the diaphragm being forced against the face of the flange. I prefer for this purpose to form one or more projections 27 on the inner face of the flange and surrounding the bore of the sleeve 20.

I prefer to thread the outer end of the tube 23 to receive a dust cap 29 although, of course, the valve may be used without such dust cap, or I could form and attach a dust cap in any other convenient manner. Through the tube 23 beyond the end of the sleeve 20, I form an opening 30 for convenience in allowing the air to escape in deinflating without entirely removing the cap 29. Instead of the hole 30, I, of course, could use any other well-known device to answer the same purpose, as cutting away the screw-thread on one side of the end of the tube 23 for a short distance from the end, or cutting one or more slits in the tube 23 extending a short distance from the end.

The parts of my valve normally rest as shown in Fig. 3. When it is desired to inflate the tube, the cap 29 is unscrewed from the tube 23 and an air pump connected thereto. The pressure of air in the tube 23 will lift the diaphragm 22 away from the end of the tube 23, and the air will pass out from the tube 23 beneath the diaphragm 22, and into the air tube C through the openings 25 or 26 in the diaphragm. When the passage of air through the tube 23 ceases, the pressure in the air tube C will return the diaphragm 22 against the end of the tube 23, preventing all escape of air from the air tube C through the tube 23. After the air pump is disconnected from the tube 23, the cap 29 is replaced and screwed down upon the end of the elastic sleeve 20, thereby forming a leak-tight joint and preventing any escape of air from the air tube C even though there should be a slight leakage into the tube 23, and also doing away with the necessity of an extra ring of packing. To deinflate the tube, the cap 29 is partially unscrewed so as to uncover the hole 30, and the end of the sleeve 20 or the cap 29 is grasped and drawn away from the rim A thereby stretching and elongating that portion of the sleeve 20 which is free about the tube 23, and drawing the end of the tube 23 away from the diaphragm 22 which is held from following the end of the tube 23 by the projections 27 on the inner face of the flange 21, and the air will escape between these projections and out through the tube 23 and the hole 30. When the air tube is deinflated, or sufficient air has escaped, the sleeve 20 is released and allowed to retract to its normal position carrying with it the tube 23, the end of which again comes in contact with and is closed by the diaphragm 22.

I prefer to form the bore of that portion of the sleeve 20 which is free about the tube 23 of slightly greater diameter than the diameter of the tube 23, so that there will be no binding action between the tube 23 and the inside wall of the sleeve 20 when the latter is stretched and elongated, but this is not essential, and the bore of the sleeve 20 may be of the same diameter throughout its length.

In Figs. 3 and 3ª is shown a spring support 31 for the dust cap 29. This spring support is preferably formed, as shown, from a piece of spring wire having one end secured to the sleeve 20, preferably by a coil 32, the dust cap being rotatably carried at the free end of the support. By this device the dust cap, when removed from the air inlet and outlet tube for inflating or other purpose, will be supported as shown in Fig. 3ª; and yet, when desired, the cap may be returned to and screwed on the end of the air inlet and outlet tube, without being detached from the support, as shown in Fig. 3. By having the dust cap thus supported when detached, all annoyance and inconvenience arising from misplacing or getting dirt in the dust cap is avoided. This spring support for the dust cap is in itself a part of my invention, and may be used with any form of valve having a detachable dust cap; and it is to be understood that the support may be of any other suitable form or material, as, for example, it might be formed of thin sheet metal cut and bent to the required shape and corrugated or crimped transversely; and the support might be attached to the wheel rim or to one of the spokes of the wheel.

Where very high pressures are to be maintained, it may be necessary to strengthen the inner part of the sleeve which is free about the tube 23, and this may be simply and effectively accomplished by winding around the outside of the sleeve one or more layers of fine wire or thread, preferably one layer, as shown in Figs. 2 and 3, thus greatly increasing its pressure resisting power, and, at the same time, not diminishing its capacity to be stretched lengthwise. This layer of wire or thread will also act as an armor to protect that part of the sleeve.

I have described my valve in connection with pneumatic tires, but it will be understood that it may be advantageously employed in connection with other inflatable tubes and bags, such as air cushions and saddles. It will also be understood that while I have here described my valve in connection with an inner elastic air tube adapted to be inclosed in an outer covering or envelope, it is also adapted to be used with pneumatic tires of the so-called hose pipe style, having but a single tube, or with tires having a plurality of tubes. It will also be understood that the outer layer of my improved air tube may form part of or be permanently attached to the tire proper, thus embodying the principle of this part of my invention in a tire of the hose pipe style.

Many modifications and variations in the constructions here shown embodying my invention will suggest themselves to one skilled in the art, and are to be considered as within the scope of my invention.

From the foregoing description, it will be seen that my invention provides a tire which shall be practically self-healing, thus doing away with the great inconvenience and delay to riders of having to stop on the road to repair a punctured tire, as is necessary with tires which collapse when punctured; and that I accomplish this without materially adding to the weight of the tire or its cost, and without sacrificing the life, or resiliency, of the tire.

My improved air valve has many points of advantage over existing air valves. It is simple and cheap, consisting in the preferred form shown, of only three parts. It is not liable to get out of order, has no small parts to get displaced or clogged with dust or dirt, and the valve stem or sleeve can be made smaller than others, thus requiring a smaller hole in the rim, by which the rim is not weakened so much as when a larger hole is used. It has a direct passage into the air tube, thus making inflation easier; and it provides for a novel and easy way for deinflating

What I claim is—

1. A pneumatic tire, having a plurality of air confining layers formed from a single strip of material, the outside layer forming the tube proper and the inside layer or layers extending longitudinally of the tire and being free from the outside layer, substantially as described.

2. An air tube for pneumatic tires formed from a single strip of thin rubber overlapped so as to form a continuous longitudinal healing flap inside the tube proper and free therefrom, substantially as and for the purpose described.

3. In a valve for pneumatic tires, the combination of an elastic sleeve, an air inlet and outlet tube within the sleeve and secured leak-tight to the outer portion thereof, and free from the inner portion thereof, and a check valve controlling the passage of air through the air inlet and outlet tube, for the purpose set forth.

4. The combination with the air tube of a pneumatic tire and the wheel rim, of an elastic sleeve extending through the rim secured to the air tube and communicating with the interior of the air tube, an air inlet and outlet tube within the sleeve and secured thereto only at and near the outer end thereof and extending normally slightly beyond the inner end of the sleeve, projections on the inner end of the sleeve, and a check valve within the air tube, substantially as and for the purpose set forth.

5. The combination with the air tube of a pneumatic tire and the wheel rim, of an elastic sleeve having a flange on its inner end which is secured to the air tube, but with the wall of the air tube left free from its central portion and opposite the end of the sleeve, the elastic diaphragm thus formed having openings therein, a tube within the sleeve secured thereto only at and near the outer portion thereof and extending normally slightly beyond the inner face of the flange, and projections on the inner face of the flange, substantially as and for the purpose described.

6. The combination with the air tube of a pneumatic tire and the wheel rim, of a flange secured to the air tube so as to leave the wall of the air tube opposite its central portion free therefrom, an elastic sleeve carried by the flange and communicating with the interior of the air tube, an air inlet and outlet tube arranged within the sleeve and extending normally slightly beyond the inner face of the flange, the sleeve being secured near its outer end to the air inlet and outlet tube, and having a portion of its bore toward the air tube of a slightly greater diameter than the diameter of the air inlet and outlet tube, and projections on the inner face of the flange, the elastic diaphragm formed of the free portion of the wall of the air tube opposite the central portion of the flange having openings therein to one side of the end of the air inlet and outlet tube, substantially as and for the purpose described.

7. In a valve for pneumatic tires, the combination of a diaphragm 22 formed of a portion of the wall of the air tube and having openings therethrough, the elastic sleeve 20 secured to the air tube by a flange 21, and the tube 23, substantially as described.

8. In a valve for pneumatic tires, the combination of a diaphragm 22, an elastic sleeve 20, a flange 21 on the inner end of the sleeve, a tube 23 and projections 27 on the end of the sleeve, substantially as described.

9. In a valve for pneumatic tires, the combination of a diaphragm 22 having openings therethrough, an elastic sleeve 20 having a flange 21 at one end, a tube 23 arranged within the sleeve and extending slightly beyond the sleeve at each end thereof, and secured to the sleeve at and near the outer end of the sleeve, a dust cap 29, and openings 30 in the tube 23 beyond the outer end of the sleeve 20, substantially as described.

10. In a valve for pneumatic tires, the combination of an elastic sleeve secured to the air tube of the tire, an air inlet and outlet tube secured within the sleeve, a check valve controlling the passage of air through the air inlet and outlet tube, and a cap adapted to screw onto the air inlet and outlet tube directly against the end of the sleeve, substantially as described.

11. The combination with the air tube of a valve for pneumatic tires, and a screw dust cap for the end of said air tube, of a spring support to which the cap is rotatively secured, substantially as described.

In testimony whereof I have hereunto set my hand in the presence of two subscribing witnesses.

CHARLES H. ROTH.

Witnesses:
JOSEPH BERLINER,
CARY J. KING.